United States Patent [19]
Ettles

[11] 3,804,474
[45] Apr. 16, 1974

[54] JOURNAL BEARINGS

[76] Inventor: Christopher Miles McCullock Ettles, 31 Wetherby Mansions, Earl Court Square, London S.W. 5, England

[22] Filed: Mar. 10, 1971

[21] Appl. No.: 122,751

[52] U.S. Cl. ............................................. 308/122
[51] Int. Cl. ............................................ F16c 17/00
[58] Field of Search ...................... 308/121, 122, 9

[56] References Cited
UNITED STATES PATENTS
| | | | |
|---|---|---|---|
| 741,628 | 10/1903 | Cooley | 308/9 |
| 2,106,860 | 2/1938 | Tibbetts | 308/4 |
| 3,150,900 | 9/1964 | Bruenig | 308/37 |

*Primary Examiner*—Charles J. Myhre
*Assistant Examiner*—Frank Susko
*Attorney, Agent, or Firm*—Pennie, Edmonds, Morton, Taylor & Adams

[57] ABSTRACT

A journal bearing assembly in which, between the shaft and the bearing bush, there are provided means for carrying lubricant around the shaft from an inlet in the region of maximum clearance of bush and shaft. These lubricant distributing means may be vanes, operating similarly to those of a vane pump, resiliently deformable elements or spring sleeves with projections to entrain the lubricant. The assembly includes an apertured cylindrical member between the shaft and bearing mounted for rotation with the shaft, the bearing being provided with a lubricant inlet in the region of the normal point of maximum clearance of shaft and bearing, a lubricant outlet in the region of the normal point of minimum clearance and a control valve associated with the outlet.

5 Claims, 3 Drawing Figures

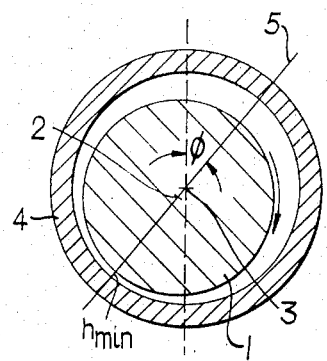
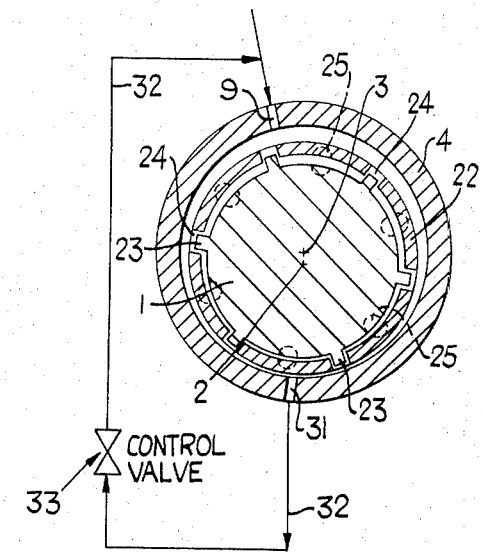
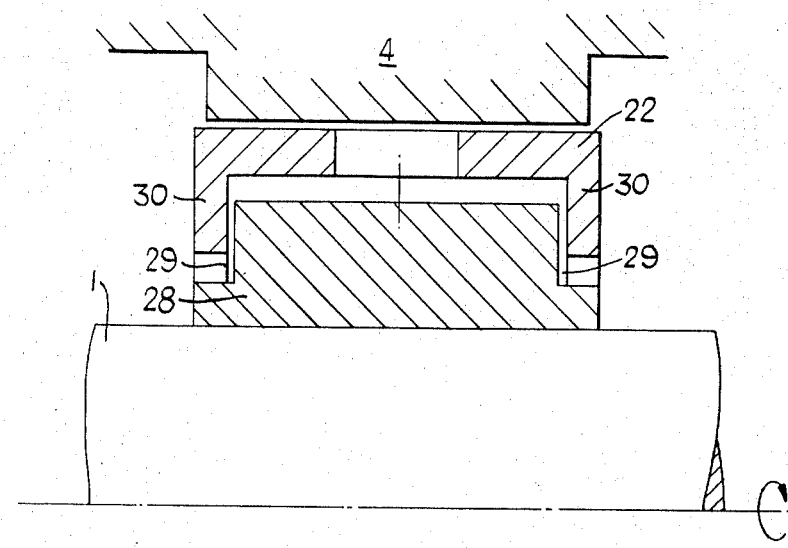

JOURNAL BEARINGS

This invention relates to journal bearings.

In a plain lubricated journal bearing, as shown in FIG. 1 of the accompanying drawings, a shaft 1 when rotating in the direction indicated has its axis 2 offset by eccentricity $e$ from the centre 3 of the bush 4 of the bearing and, assuming the load on the shaft to be vertically downwards, the line of centres 5 is inclined from the vertical in the direction of rotation of the shaft by an angle $\phi$ that depends upon the clearance ratio, speed of rotation and the viscosity of the lubricating fluid. The working clearance, which is shown much exaggerated for clarity, has a minimum $h_{min}$ on the line of centres below the axis of the shaft 1, there being a hydrodynamic wedge beneath the shaft leading up to this minimum clearance position. For a given acceptable $h_{min}$ the load capacity is proportional to (speed $x$ viscosity). However, situations frequently arise where the load is too high or the speed too low for an adequate hydrodynamic wedge to be generated. The solution of increasing the size of the bearing is not always practical.

According to the present invention there is provided a journal bearing assembly comprising a shaft, a bearing for rotationally supporting said shaft, an apertured cylindrical member provided between the shaft and the bearing with clearance between itself and both the bearing and the shaft for distributing lubricating fluid around the shaft, the cylindrical member being mounted for rotation with the shaft constrained by projections that fit in apertures in the cylindrical member, and the cylindrical member having restricted radial movement.

For a better understanding of the invention and to show how the same may be carried into effect, reference will now be made, by way of example, to the remaining Figures of the accompanying drawings, in which:

FIG. 2 is a cross-section of a journal bearing according to the invention, and

FIG. 3 is a half axial section of a journal bearing such as that of FIG. 2 showing end sealing means.

In FIG. 2 the shaft and bush, their axes and their line of centres are referenced as in FIG. 1.

The journal bearing of FIG. 2 has a rigid cylindrical intermediate member 22 with clearance between its outer surface and the bush 4 and with clearance between its inner surface and the shaft 1. The member 22 rotates with the shaft 1, being engaged by a number of radial plungers 23 fitted to the shaft itself or to a ring (not shown) force fitted on the shaft. The plungers 23 are loose fit in apertures 24 in the member 22 to allow passages for lubricant, entering from the inlet 9, to pass from one side of the member 22 to the other. The member 22 is similar to a heavy brass cage used in some ball bearing applications. The surface of the shaft 1 between the plungers 23 and/or the inner surface of the member 22 between the apertures 24 may have axially parallel grooves 25, indicated in outline, formed therein to allow oil trapped between the member 22 and the shaft 1 more easily to escape, thereby permitting the member 22 to take up a greater eccentricity relative to the shaft so that the self-pressurising action, discussed in more detail below, can be enhanced.

When the shaft is rotated oil from the inlet 9 is entrained by the pocket defined by the member 22 and the two adjacent plungers 23 momentarily either side of the inlet. This oil is taken around with the shaft in the manner of a vane pump. As each pocket moves from its uppermost position to the lowermost position, where the clearance between shaft and bush is a minimum, lubricant is forced out of the pockets and between the plunger tips and the bush, the increasing pressure in the pocket causing this flow to take place, and the action of the plungers on the lubricant between the plunger tips and the bush effectively increasing the lubricant pressure at this zone. The pressure developed in the pockets is composed of both hydrostatic and hydrodynamic pressure, the first being due to the vane pump principle and the second being generated in the same way as the plain journal bearing described in connection with FIG. 1. The hydrostatic pressure is dependent on the rate of changes of pocket volume V with angle $\theta$ of rotation $(dV/d\theta)$ and the clearance between the plunger tips and the bush. The clearance ratio of the present "intermediate ring" bearing (the member 22 being the intermediate ring) would be of the order 0.01 compared with 0.001 for the plain journal bearing as this will give a much larger $(dV/d\theta)$ for a given eccentricity ratio $\epsilon$.

The present intermediate ring bearing has a characteristic in reverse to plain bearings in that the minimum film thickness (between plunger tips and bush) will decrease with increasing eccentricity $e$ since $dV/d\theta$ is proportional to $\epsilon$, the eccentricity ratio. As the flow from a pocket between its upper and lower positions increases with $\epsilon$, the film thickness under the plunger tips must increase to accommodate the flow. The intermediate ring bearing offers an increase in load capacity at any speed and should be particularly useful at low speeds or when starting under load is a problem.

A condition used in the mathematical analysis of the bearing shown in FIG. 2 is that the oil film forces acting on both sides of the cylindrical member 22 must be equal. That is in general terms:

$$\iint p r_1 \sin\theta \, d\theta \, dz = \iint P r_2 \sin\theta \, d\theta \, dz$$

and $$\iint p r_1 \cos\theta \, d\theta \, dz = \iint P r_2 \cos\theta \, d\theta \, dz$$

where $r_1, r_2$ are the inner and outer radii of the cylindrical member and $p$, $P$ are the locally varying oil pressures on the inner and outer faces. The ordinate $z$ is in the axial direction.

The radial clearance between the cylindrical member and the bearing is best chosen to be of the same order as that used for plain journal bearings (FIG. 1) which is $(c_r/R) \approx 0.001$ where $c_r$ is the radial clearance between the shaft or cylindrical member and the bush. For the arrangement shown in FIG. 2 the radial clearance $c_p$ between the bush and a circle circumscribing the plungers, and the eccentricity ratio $\epsilon_p$ of this circle relative to the bearing are important parameters which govern the extent of the internal pumping action giving the self pressurising effect.

Calculations have been made for a bearing similar to that of FIG. 2, assuming six equispaced rectangular apertures each of whose axial dimensions is half that of the cylindrical member 22 and whose circumferential dimension is equal to that of the lands between apertures. The projections or plungers in these examples were taken to be in sealing engagement with the apertures rather than a loose fit. The following tables give a comparison between such bearings (referred to as intermediate ring bearings) and a plain journal bearing.

$$\frac{\text{Clearance of Pistons}}{\text{Clearance of Ring}} = 3.0 \text{ COMPARISON OF PLAIN BEARING AND INTERMEDIATE RING BEARING}$$

| Case | $\epsilon_r$ | $\epsilon_p$ | Sommerfield S | Relative load capacity | Attitude $\phi$ (rads.) | Q' flow | Relative flow | Absorbed in shear | Absorbed in pumping | Total H' Power | Relative | ΔT Relative temp. rise |
|---|---|---|---|---|---|---|---|---|---|---|---|---|
| Plain | .5 | | 1.96 | (1.00) | .958 | 294 | (1.00) | 493 | nil | 493 | (1.00) | 168 |
| Intermediate ring. | | .5 | 8.63 | 4.39 | .827 | 899 | 3.06 | 400 | 91 | 491 | .995 | 55 |
| | | .7 | 12.2 | 6.21 | .823 | 1230 | 4.19 | 413 | 181 | 594 | 1.20 | 48 |
| | | .9 | 15.6 | 7.97 | .821 | 1560 | 5.31 | 426 | 300 | 726 | 1.47 | 47 |
| Plain | .7 | | 5.42 | (1.00) | .710 | 411 | (1.00) | 593 | nil | 593 | (1.00) | 145 |
| Intermediate ring. | | .5 | 14.9 | 2.74 | .680 | 874 | 2.12 | 496 | 137 | 633 | 1.07 | 72 |
| | | .7 | 21.1 | 3.89 | .674 | 1180 | 287 | 533 | 273 | 806 | 1.36 | 68 |
| | | .9 | 27.3 | 5.03 | .671 | 1490 | 3.63 | 561 | 457 | 1020 | 1.72 | 68 |
| Plain | .9 | | 32.4 | (1.00) | .409 | 521 | (1.00) | 1050 | nil | 1050 | (1.00) | 202 |
| Intermediate ring. | | .5 | 34.7 | 1.07 | .538 | 836 | 1.60 | 894 | 261 | 1160 | 1.11 | 138 |
| | | .7 | 48.2 | 1.49 | .548 | 1120 | 2.14 | 971 | 532 | 1500 | 1.43 | 135 |
| | | .9 | 61.7 | 1.90 | .553 | 1400 | 2.69 | 1050 | 898 | 1950 | 1.86 | 139 |

$$\frac{\text{Clearance of Pistons}}{\text{Clearance of Ring}} = 9.0 \text{ COMPARISON OF PLAIN BEARING AND INTERMEDIATE RING BEARING}$$

| Case | $\epsilon_r$ | $\epsilon_p$ | S | Relative load capacity | Attitude $\phi$ (rads.) | Q' flow | Relative flow | Absorbed in shear | Absorbed in pumping | Total H' Power | Relative | ΔT Relative temp. rise |
|---|---|---|---|---|---|---|---|---|---|---|---|---|
| Plain | .5 | | 1.96 | (1.00) | .958 | 294 | (1.00) | 493 | nil | 493 | (1.00) | 168 |
| Intermediate ring. | | .5 | 26.1 | 13.3 | .817 | 2550 | 8.67 | 469 | 841 | 1310 | 2.66 | 51 |
| | | .7 | 36.6 | 18.7 | .816 | 3540 | 12.0 | 507 | 1650 | 2160 | 4.38 | 61 |
| | | .9 | 47.1 | 24.0 | .815 | 4530 | 15.4 | 546 | 2740 | 3280 | 6.65 | 72 |
| Plain | .7 | | 5.42 | (1.00) | .710 | 411 | (1.00) | 593 | nil | 593 | (1.00) | 145 |
| Intermediate ring. | | .5 | 45.9 | 8.47 | .666 | 2410 | 5.86 | 647 | 1290 | 1940 | 3.26 | 80 |
| | | .7 | 64.5 | 11.9 | .664 | 3340 | 8.13 | 733 | 2540 | 3280 | 5.52 | 98 |
| | | .9 | 83.2 | 15.4 | .663 | 4260 | 10.4 | 819 | 4220 | 5040 | 8.50 | 118 |
| Plain | .9 | | 32.4 | (1.00) | .409 | 521 | (1.00) | 1050 | nil | 1050 | (1.00) | 202 |
| Intermediate ring. | | .5 | 103 | 3.18 | .554 | 2230 | 4.28 | 1260 | 2570 | 3830 | 3.64 | 171 |
| | | .7 | 145 | 4.47 | .553 | 3070 | 5.89 | 1480 | 5090 | 6574 | 6.26 | 214 |
| | | .9 | 187 | 5.76 | .552 | 3910 | 7.50 | 1700 | 8470 | 10,200 | 9.71 | 260 |

$E_r$ is an assumed eccentricity ratio of the ring $E_p$ is an assumed eccentricity ratio of the circle circumscribing the pistons or plungers.

FIG. 3 illustrates diagrammatically an end sealing arrangement suitable for the bearing of FIG. 2. In this case the shaft has a sleeve 28 fitted thereon at the ends of which are annular recesses 29 which accommodate inwardly projecting annular flanges 30 at the ends of the apertured cylindrical member, these flanges forming oil restriction plates. Alternatively the sleeve could be flanged to form such plates.

Although the possible eccentricity between shaft and bearing is greater than the bearings of the invention described as compared with a plain journal bearing, the arrangement does lend itself to accurate control of the position of the shaft centre. The high pressure area (the region of the normal point of minimum clearance) as illustrated in FIG. 2 may have a lubricant outlet 31 connected into a bleed duct 32 with a control valve 33 therein leading back outside the bearing to the inlet 9 and to the low pressure area. The amount of high pressure lubricant leaked from the high pressure area can then be continuously controlled to maintain the shaft centre at a desired position. This arrangement would be suitable, for example, for rolling mills where strip thickness has to be accurately maintained.

The oil (lubricant) inlet 9 may be in any position within 90° of the point of maximum clearance.

I claim:

1. A journal bearing assembly comprising a shaft, a bearing for rotationally supporting said shaft, a cylindrical member provided between the shaft and the bearing with clearance between itself and both the bearing and the shaft distributing lubricating fluid, at least three apertures circumferentially spaced and extending completely through the wall of said cylindrical member, projections on said shaft loosely extending into all of the apertures of said cylindrical member whereby said cylindrical member is rotated by said shaft, said cylindrical member being restrictedly radially movable whereby said projections and apertures are relatively movable, said relative movement between said projections and said apertures being such that lubricating fluid flows through said apertures from one side of the cylindrical member to the other side and said projections force lubricating fluid from said apertures into the adjcent clearance space between said cylindrical member and said bearing.

2. A journal bearing assembly as claimed in claim 1, wherein at least one of the outer surface of the shaft and the inner surface of the cylindrical member has grooves for providing an escape for lubricating fluid axially of the bearing.

3. A journal bearing assembly as claimed in claim 1, wherein the bearing is provided with a lubricant inlet within 90° of the maximum clearance point of shaft and bearing.

4. A journal bearing assembly as claimed in claim 3, wherein the bearing is provided with a lubricant inlet in the region of the normal point of maximum clearance of shaft and bearing.

5. A journal bearing assembly as claimed in claim 3, wherein the bearing is provided with a lubricant outlet in the region of the normal point of minimum clearance of shaft and bearing, and further comprising a control valve associated with said outlet to govern the amount of lubricant bled from the bearing.

* * * * *